United States Patent

Smith et al.

[11] Patent Number: 6,133,644
[45] Date of Patent: Oct. 17, 2000

[54] SURF-DRIVEN ELECTRICAL APPARATUS

[75] Inventors: Joseph Smith, Brockton; Richard Cornely, Mattapan, both of Mass.

[73] Assignee: 374's Electric Power Corporation, Brockton, Mass.

[21] Appl. No.: 09/200,777

[22] Filed: Nov. 28, 1998

[51] Int. Cl.[7] .............................. F03B 13/10; F03B 13/12
[52] U.S. Cl. ............................... 290/53; 290/42; 290/43; 290/54
[58] Field of Search ................................. 290/45, 52, 53, 290/55

[56] References Cited

U.S. PATENT DOCUMENTS

| | | | |
|---|---|---|---|
| 4,013,379 | 3/1977 | Bolding | 417/100 |
| 4,023,041 | 5/1977 | Chappell | 290/53 |
| 4,137,005 | 1/1979 | Comstock | 415/2 |
| 4,301,377 | 11/1981 | Rydz | 290/43 |
| 4,375,151 | 3/1983 | French | 60/398 |

*Primary Examiner*—Elvin Enad

[57] ABSTRACT

An apparatus for converting the energy of the ocean's surf into electricity, which comprises a buoyant body that floats on the surface of the water and rises and falls with the waves, at a fixed and predetermined distance from the shore. Fixed securely to the buoyant body, is a horizontally extending shaft, in such a manner that it bears a constant height above the water's surface, regardless of water amplitude variation, and/or height of tide. Connected to the shaft are blades which are rotably mounted. Said blades will intercept the ocean at a point where the surf breaks, and shall receive the energy produced from the breaking wave. Said energy shall be converted into mechanical energy by driving the blades in motion, which in turn rotates the shaft. An electric power generator is drivingly connected to the shaft, whereby producing electricity.

4 Claims, 2 Drawing Sheets

SURF-DRIVEN ELECTRICAL APPARATUS

BACKGROUND

1. Field of Invention

This invention relates to hydroelectric devices, specifically to an electrical apparatus which employs an improved process for extracting the surf's kinetic energy, and transforming this energy into mechanical energy for the generation of electricity.

2. Description of Prior Art

For well over a quarter of a century, there have been many attempts to provide a system, which is capable of harnessing the energy of the ocean's waves, tides, and surfs, to produce useful energy-like electricity. Since the equipment required for deriving power from the ocean must be placed in the ocean for long periods of time, there is a need for a simple system that does not damage the environment, and which also requires minimum parts and maintenance. Furthermore, due to the fact that the water flow and its direction of impact are not constant and steady, the prior devices have not been able to efficiently derive energy from the ocean. Attempts have been made to provide ocean wave power generators that use compact water wheels, as disclosed in U.S. Pat. Nos. 4,467,218 and 4,636,141. Attempts have also been made with generators that use a plurality of paddle wheels, as disclosed in U.S. Pat. Nos. 4,023,041 and 4,301,377. The problem however with either the compact water wheels or the plurality of paddle designs is that they are inherently water current driven designs, and as such they have not been able to derive the maximum energy of the ocean in an efficient manner.

Some other attempts, however, have been specifically designed to provide power from the ocean by extracting the energy in the ocean's surf. In essence, the surf is the swell of the sea that brakes upon the shore. One of the most powerful surfs is found in Hawaii, where the breaking wave may peak at 9 m (30 ft)

When reviewing the prior art that specifically addresses the extraction of energy from the ocean's surf, we see various apparatuses which have been devised to achieve this objective as disclosed in U.S. Pat. Nos. 3,994,629 and 5,507,943. In U.S. Pat. No. 3,994,629, the energy of the surf is collected and stored in the form of a potential energy reservoir to be converted into electrical energy at a later date. The complexity or feasibility of such collection and transformation cycle is not well known. In U.S. Pat. No. 5,507,943, the surf is broken in the open sea by a floating hollow sea wall designed to stop the water waves and thereafter, use the accumulation of water energy in conjunction with a push and pull electric generator. None of the above attempts try to directly use a breaking surf's potential energy.

OBJECTS AND ADVANTAGES

Accordingly, several objects and advantages of the present invention are:

(a) a cost efficient, simplistic, and superior mechanism, that can harness the energy of the ocean by directly tapping into the potential energy of a breaking surf on a seashore.

(b) a design which maxially extracts the energy in the surf. This apparatus is different and superior to any other such devices that have tried to use the surf to produce electricity for the following reasons:

(1) The surf-driven electrical apparatus is a compact system made of a single shaft water wheel rather than the plurality of paddle design water wheels. This allows the paddles to be placed optimally across perimeter sections and along the length of said shaft. The optimality of paddle placement is an important aspect of the energy harnessing and conversion system since it allows the capture of the maximum amount of the surf's energy input, and minimizes the common problems associated with under current feedback. In fact, It takes from 2 to 10 seconds for an incoming wave front to completely break into its surf components on the seashore. As a result, as the wave front approaches the shore, sections of it will reach the shore first while other sections will lag. Optimally designing the shaft by appropriately placing the paddles along a segment of its length and perimeter in order to take advantage of the natural motion of such a wave front is an essential feature of our surf-driven electrical apparatus design.

(2) The apparatus taps both directly and continuously into the surf s energy;

(3) The apparatus requires no additional technological developments;

(4) The apparatus requires no extensive building costs;

(5) The apparatus is not damaging to the environment;

(6) The apparatus is capable to potentially provide to date, the highest input/output power conversion of any existing hydroelectric conversion apparatus. In order to articulate the kinds of input/output conversion ratios that can be achieved by this apparatus, let's look at a simple example:

We will assume for simplicity that:

a) There is only one paddle along the shaft of dimensions $W_p$=3 ft, $H_p$=10 ft b) The breaking surf is of dimensions $H_s$=4 ft, $D_s$=5 ft moving at an average velocity $v_s$=3 ft/s for an average time $t_s$=3 s.

The potential energy that can be extracted from such surf can be computed by starting with Newton's first law:

ti F=$ma$ m=mass of a column of water (kg)
a=the average acceleration of the column of water (m/s$^2$)
F=the force (N)

But: $m=\rho V$

And: $a=v_s/t_s$

Where:
V: is the efficient volume of water i.e., the water that actually impacts upon the paddle.
$\rho$: The density of water Therefore:

$F=\rho V v_s/t_s$

F (kg m/s$^2$)=(1000 kg/m$^3$)(4 ft*0.3048 m/ft)*(4 ft*0.3048 m/ft)*(5 ft*0.3048 m/ft)*(3×0.3048)m/s*(1/3 s)

F=517.8585 N

The Power in Watts of the surf is therefore computed as:

$P=F*v_s$

P=517.8585*(3ft/s)=1.5536e+003W

And consequently, the Energy is computed as:

$$E=(1.5536e+003w/s)*(3600s/h)*(24h/day)=1.3423e+008W/day=134.23Mw/day.$$

It is now easy to extend the real capability of our device by the imputation of a simple variable, for instance, a 24-ft shaft that contains 24 paddles.

$$E=134.23MW*24=3,221.5MW/day$$

In addition, typical surf heights and widths vary between 10 to 30 ft and 10 to 20 ft respectively. Their average velocity varies between 10 to 20 ft/s. A typical input poter for a surf column with dimensions $H_s=30$ ft, $D_s=10$ ft, moving at an average velocity $v_s=10$ ft/s for an average time $t_s=3$ s produce an input energy E:

$$E=1.9597e+008MW/year=195,970,000NW/year$$

Still, further objects and advantages will become apparent from a consideration of the ensuing description and accompanying drawings.

SUMMARY

An apparatus and process for converting the energy of the ocean's surf into electricity wherein a shaft is connected to an electric generator, where the shaft also has blades, that extend from a segment of the shaft's periphery at angular intervals. The blades are placed in the crest of a breaking surf, and said blades are driven by the surf, which in turn rotates the shaft, which in turn drives the generator, thereby producing electricity.

Preferred Embodiment—Description

Figure 1:
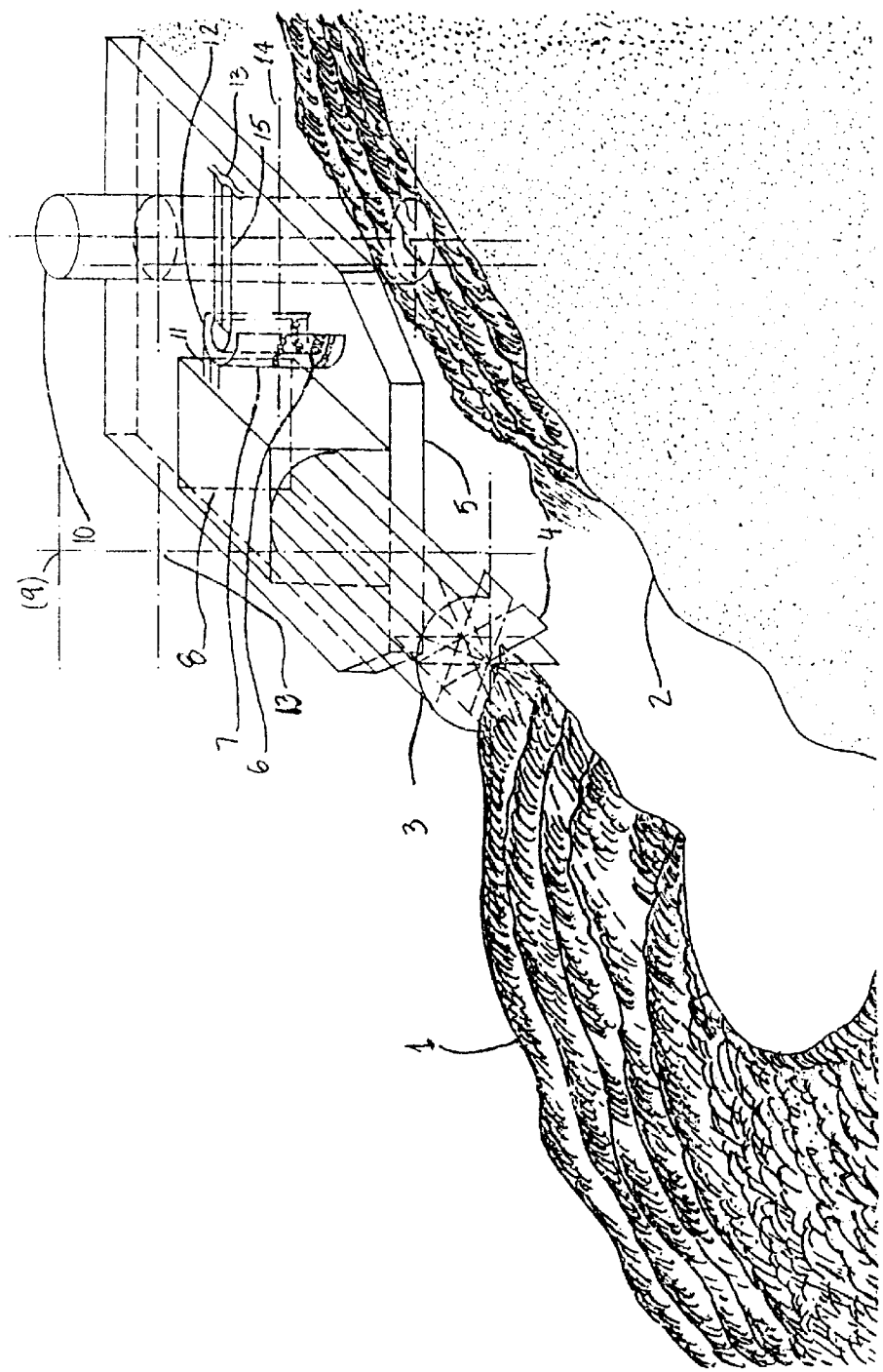
FIG. 1 shows a perspective view of the surf-driven electrical apparatus as showing the location of same in the crest of an incoming surf.
Figure 2:
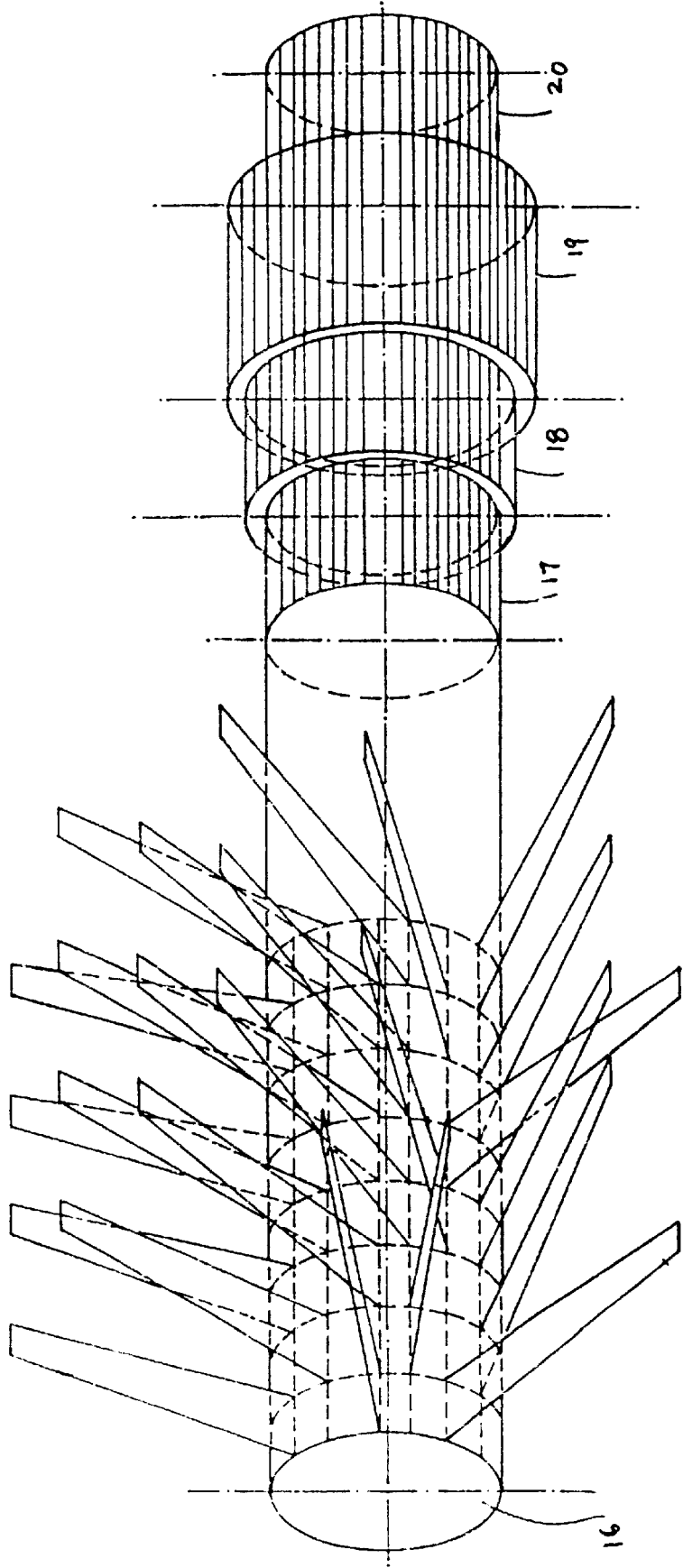
FIG. 2 shows a perspective view of the shaft of the surf-driven electrical apparatus.

A preferred embodiment of the apparatus is illustrated in FIG. 1 (perspective view), and more specifically the shaft as illustrated in FIG. 2. The shaft 15 having radial blades 2 partially submerged in the crest of an incoming surf 1. In the preferred embodiment the blades can be made of any material which is rigid enough to withstand the continuous force of a moving body of water the size of the relative surf. The blades are connected to a horizontally extending shaft 15. The blades 2 are mounted rotably at angular intervals on the shaft 15 and in such a manner so that no two blades 2 line the same plane. The shaft 15 also can be made of any rigid non-corrosive alloy. The shaft 15 is connected to an electric generator 6. The generator 6 is mounted on a floatable platform 3 which is secured to the ocean's floor by a set of fixed columns 5, 13, and 14 such that the platform 3 rises and falls with the height of the ocean in such a manner, that the shaft 15 and blades 2 maintain a constant relationship to the crest of the surf 1.

The columns 5, 13, and 14 shall incorporate a system which allows the elevation and de-elevation of the platform corresponding to the water level. Various types of these systems have been widely used in the prior art to achieve this effect. One type of system could incorporate the utilization of splined sleeves and gears containing teeth, said gears would which mesh with the splines, and ride up and down on the splined sleeve, which in turn rises up and down on the columns 5, 13, and 14 in responses to the up and down movement of the platform due to changes in the water level. Another type of system could incorporate placing wheels on the columns 5, 13, and 14 which are guided by tracks which extend alongside the columns 5, 13, and 14. The preferred embodiment would incorporate the wheel/track system that has been used in the prior art.

As the blades 2 intersect with the breaking surf 1 and thus converting the force of the breaking surf's momentum into rotational motion, this motion in turn drives the generator 6 which produces electrical energy. The electricity from the generator is carried by a set of wires 21 to a connector 11 which is capable of vertical movement such that when the platform 6 rises or falls, the connecting wires 12 which go to the wires existing from the shore grid 8 remain in a fixed position, and only the connector 11 moves with the platform.

The connector 11 is isolated by a non-conductive and non-corrosive covering 10. The shaft 15 is protected by a shield 9 which covers the unsubmerged portion of the shaft 15 and blades 2.

At the intersecting part of the shaft 15 and the generator 6, the shaft 15 has a series of gears 16–19, such that the revolutions per minute of the generator may be controlled by the engaging of one of the gears 16–19 thereby regulating the output of electrical power.

Conclusions, Ramifications, and Scope

Accordingly, it can be seen that through the calculations, a relatively simple process has been employed, which takes advantage of the tremendous amount of energy contained in the surf, and which seeks to extract this tremendous amount of energy in order to produce electricity.

Although the description above contains many specificities, these should not be construed as limiting the scope of the invention but as merely providing illustrations of some of the presently preferred embodiments of this invention. Various other embodiments and ramifications are possible within it's scope. For example, since the size of generators can vary in weight, it is quite possible that a generator which is massive in weight could not be mounted on the floatable platform, without causing the platform to sink another embodiment of the apparatus would require the generator to remain on-shore, so that the weight of the generator could be supported by the ground underneath it also, the gear system can be substituted to utilize a sprocket system, which would be engaged by a chain or a series of chains for rotation thereby upon pivotal movement of the shaft.

Thus, the scope of the invention should be determined by the appended claims and their legal equivalents, rather than by the examples given.

What is claimed is:

1. Apparatus for converting the energy of the ocean's surf into electricity, the apparatus comprising:

(a) a shaft, having a plurality of blades extending radially at angular intervals from a segment of its periphery, said blades extending radially only at one end of said shaft,
(b) the other end of said shaft in communication with power generating means, and operably driven by rotation of said shaft,
(c) fixedly mounted to the end of said shaft which is in communication with said power generating means are gear means, when engaged, regulates the rotations per minute of the power generating means from said shaft thereby regulating the power of the ocean's surf,
(d) said blades which extend from said shaft are partially submerged in the crest of an incoming surf, whereby said blades are driven by the force of said surf, which in turn rotates said shaft,
(e) platform means which supports said shaft and said power generating means, said platform means is capable of buoyancy on the ocean's surface, and is placed at a predetermined distance from the ocean's shore, adjacent to the surf, and situated in a position which places said shaft in the crest of said incoming surf.

2. Apparatus for converting the energy of the ocean's surf into electricity as recited in claim 1 wherein said shaft contains a series of multiple blades mounted rotably at angular intervals, so that no 2 blades line the same horizontal plane.

3. Apparatus for converting the energy of the ocean's surf into electricity as recited in claim 1 wherein said shaft is encased by a shield of non-corrosive material.

4. Apparatus for converting the energy of the ocean's surf into electricity as recited in claim 1 wherein said shaft extends horizontally from said power generating means, and above the ocean's surface in such a manner that said extended shaft and blades maintains a constant relationship to the crest of the surf.

* * * * *